(12) United States Patent
Saini et al.

(10) Patent No.: US 7,423,646 B2
(45) Date of Patent: Sep. 9, 2008

(54) SMART SHAPE INSERT

(75) Inventors: Shailesh Saini, Seattle, WA (US);
Crystal L Hoyer, Redmond, WA (US);
Matthew J Kotler, Kenmore, WA (US);
Gary A Pritting, Issaquah, WA (US);
Karen K Wong, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 253 days.

(21) Appl. No.: 11/269,055

(22) Filed: Nov. 8, 2005

(65) Prior Publication Data

US 2007/0103468 A1 May 10, 2007

(51) Int. Cl.
*G06T 11/20* (2006.01)
(52) U.S. Cl. .................. 345/440; 715/244; 715/246
(58) Field of Classification Search .................. 345/440
See application file for complete search history.

(56) References Cited

U.S. PATENT DOCUMENTS

| | | | |
|---|---|---|---|
| 4,710,763 A | | 12/1987 | Franke et al. |
| 4,855,726 A | * | 8/1989 | Nishio .................. 345/440 |
| 5,408,601 A | | 4/1995 | Nakamura et al. |
| 5,450,535 A | * | 9/1995 | North .................... 345/440 |
| 5,467,440 A | * | 11/1995 | Nihei .................... 345/440 |
| 5,490,246 A | * | 2/1996 | Brotsky et al. ............ 715/763 |
| 5,495,567 A | * | 2/1996 | Iizawa et al. ............ 715/762 |
| 5,633,955 A | | 5/1997 | Bozinovic et al. |
| 5,704,028 A | * | 12/1997 | Schanel et al. ............ 345/440 |
| 5,982,383 A | * | 11/1999 | Kumar et al. ............ 345/440 |
| 6,084,598 A | | 7/2000 | Chekerylla |
| 6,118,897 A | * | 9/2000 | Kohno .................... 382/190 |
| 6,128,617 A | * | 10/2000 | Lowry .................... 707/100 |
| 6,154,220 A | * | 11/2000 | Prakriya et al. .......... 345/440 |
| 6,219,053 B1 | * | 4/2001 | Tachibana et al. .......... 715/835 |
| 6,222,559 B1 | * | 4/2001 | Asano et al. ............ 345/440 |
| 6,278,464 B1 | * | 8/2001 | Kohavi et al. ............ 345/440 |
| 6,393,425 B1 | | 5/2002 | Kelly |
| 6,781,597 B1 | | 8/2004 | Vrobel et al. |

(Continued)

FOREIGN PATENT DOCUMENTS

WO    WO 03/034305 A1    4/2003

(Continued)

OTHER PUBLICATIONS

"The SmartDraw Suite Edition: Features and Specifications," SmartDraw.com, ©2005, <http://www.smartdraw.com/product/ste/features.htm> [retrieved Aug. 29, 2005], 10 pages.

(Continued)

*Primary Examiner*—Kee M. Tung
*Assistant Examiner*—David H Chu
(74) *Attorney, Agent, or Firm*—Christensen O'Connor Johnson Kindness PLLC

(57) ABSTRACT

A method for determining the location of a shape to be inserted into a diagram representing a data graph is disclosed. The method comprises determining a starting shape within the diagram; retrieving the number of nodes associated with the node associated with the starting shape; and comparing a preferred number of child nodes associated with the node associated with the starting shape to the current number of child nodes associated with the node. The results of the comparison are used to determine the node to be inserted in the data graph, the location of the node in the data graph, and the location of the shape in the diagram.

18 Claims, 9 Drawing Sheets

U.S. PATENT DOCUMENTS

| | | | |
|---|---|---|---|
| 6,980,211 B2* | 12/2005 | Lin et al. | 345/440 |
| 7,043,393 B2* | 5/2006 | Fuller et al. | 702/127 |
| 7,062,718 B2* | 6/2006 | Kodosky et al. | 715/771 |
| 7,196,705 B2* | 3/2007 | Gallivan | 345/440 |
| 2001/0010519 A1* | 8/2001 | Erskine | 345/440 |
| 2004/0261029 A1 | 12/2004 | Skjaervik | |
| 2005/0093866 A1* | 5/2005 | Ebert | 345/440 |
| 2005/0123892 A1 | 6/2005 | Cornelius et al. | |
| 2006/0277060 A1* | 12/2006 | Antognini | 705/1 |
| 2006/0290697 A1* | 12/2006 | Madden et al. | 345/440 |

OTHER PUBLICATIONS

"Introducing Microsoft Office Visio 2003," ©2005, Microsoft Corporation, <http://office.microsoft.com/en-us/assistance/HA010731211033.aspx> [retrieved Aug. 29, 2005], 4 pages.

* cited by examiner

SMART SHAPE INSERT

BACKGROUND

Computing devices executing the appropriate computer software are often used to create information graphics such as, but not limited to, diagrams, charts, graphs, and maps. For ease of discussion an information graphic is generically referred to herein as a "diagram." A diagram is a visual representation of a data model, i.e., a software structure in which computer software programs store persistent information, e.g., a data graph. Computer software programs that can create diagrams visually representing data models are generically referred to herein as "diagramming applications."

Diagramming applications are usually supported by a graphical user interface (GUI). A GUI is a computer software component, executed by a computing device, that presents visual elements in a display. A typical diagramming application provides a plurality of types of information graphics, i.e., diagram types, to enable the representation of different aspects of data models. Indeed, a diagramming application becomes more useful with each diagram type the diagramming application provides. Often, diagrams of differing types not only differ in appearance but also in how the diagrams are assembled. A command or control in a diagramming application used to insert visual elements into diagrams may not produce the same results in diagrams of differing types. Many diagram types often require a large number of actions to insert and position visual elements in a diagram.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method and apparatus, including computer-readable medium, for determining the location of a shape inserted into a diagram representing a data graph is disclosed. The method comprises collecting information about a starting shape in the diagram; selecting a diagram definition in accordance with the diagram's type; extracting information from the diagram definition; and using the information extracted from the diagram definition and the information about the starting shape.

The information extracted from the diagram definition and the information about the starting shape is used to determine the type of node to associate with the inserted shape, the location of the associated node in the data graph, and the inserted shape's location in the diagram.

Information about the starting shape includes, but is not limited to, the starting shape's type, associated node, and parent node. Information about the starting shape also includes the number of child nodes of the starting shape's node and the number of child nodes of the parent node of the starting shape's node. The information extracted from the diagram definition comprises the preferred number of child nodes for the starting shape's node and the preferred number of child nodes for the parent node of the starting shape's node.

The preferred number of child nodes of the starting shape's node is compared to the number of child nodes of the starting shape's node. The preferred number of child nodes for the parent node of the starting shape's node is compared to the number of child nodes of the parent node of the starting shape's node. The results of the comparisons are used to determine the type of node to associate with the inserted shape, the location of the associated node in the data graph, and the inserted shape's location in the diagram.

The results of the comparisons are also used to determine whether or not to disable user interface controls for inserting shapes in a diagram. The insertion of a shape based on the results of the comparison are able to be overridden by a selection in a user interface control for inserting shapes in a diagram.

With no modification, the method is able to provide smart shape insertion for diagram types for which there are diagram descriptions.

A starting shape in a diagram may be a selected shape or predetermined default shape. An inserted shape may be a shape, a semantic bullet, or a format bullet.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
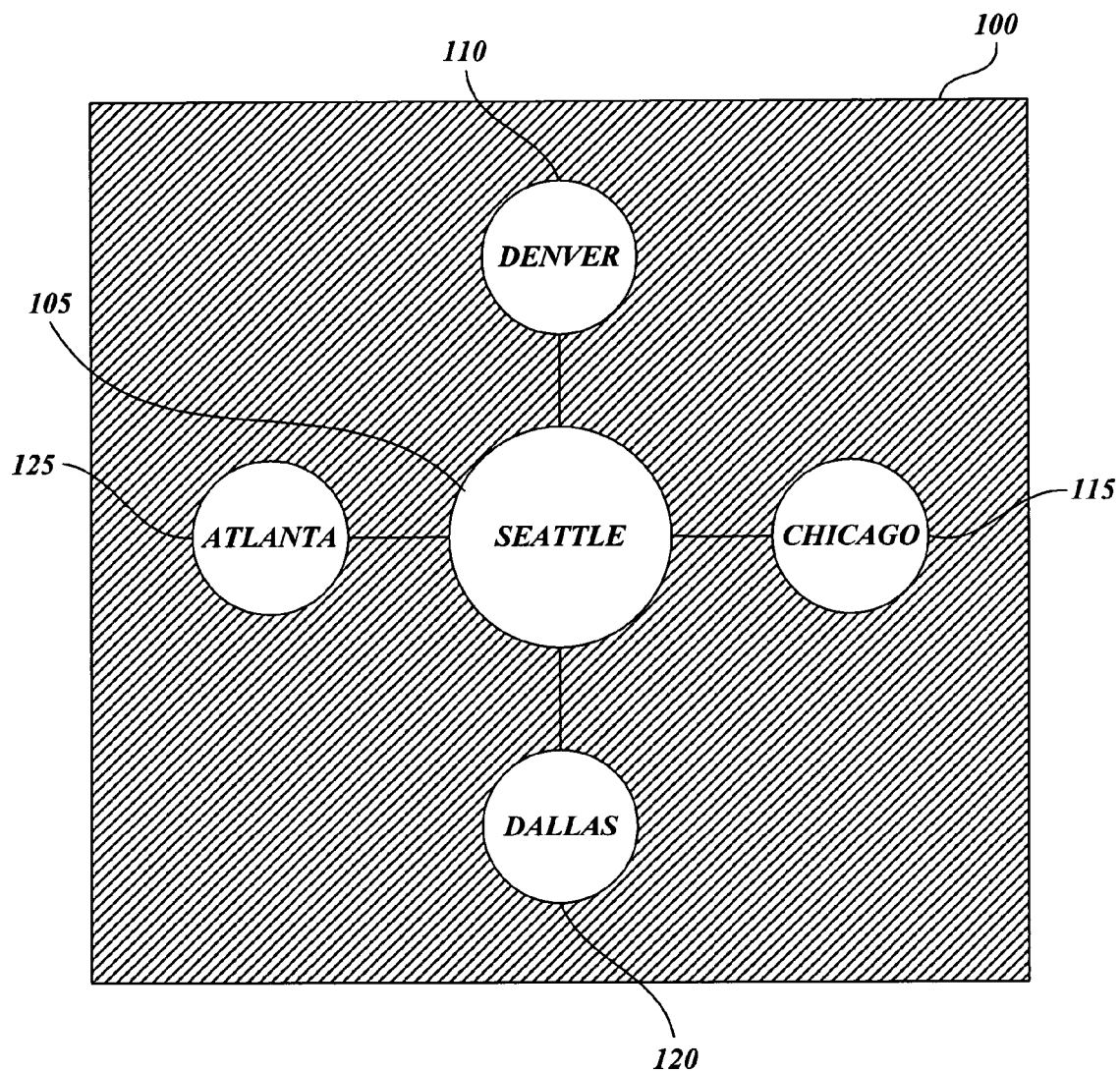
FIG. 1 is a pictorial illustration of an exemplary pane in an exemplary GUI containing an exemplary radial diagram.

Diagrams are information graphics that represent data models or aspects of data models. Data models are often graph structures i.e., data graphs. A type of data graph is a data tree, i.e., tree. A tree is a data structure containing a plurality of nodes that occupy a plurality of levels and are connected in a hierarchical fashion by links. While a node often contains, refers to, or is associated with data, a node may also be empty, i.e., a placeholder. A node can connect to one node in the level above the node, the node's parent node. A node can connect to many nodes in the level below the node, the node's child nodes. Nodes with the same parent node are sibling nodes. Nodes on the same node level are peer nodes. The root node, i.e., root, is the only node in the top level of a tree. The root can have zero or more child nodes, which occupy the next level of the tree. Each child in the level can have zero or more child nodes, which occupy the next level and so on.

Diagrams representing data models or aspects of data models may be created using applications, i.e., diagramming applications. Diagramming need not be the primary purpose of a diagramming application. An application that uses diagramming functions to support a purpose other than diagramming may also be considered a diagramming application. Diagramming applications often support a plurality of diagram types designed to present different aspects of data models. Diagramming applications, with support from a GUI, enable users to view diagrams and manipulate the visual elements comprising the diagrams.

To enable users to manipulate or otherwise interact with visual elements, a GUI displays a "cursor," i.e., a small moveable graphic symbol, e.g., an arrow, used to point to visual elements. Cursor movement is usually controlled by a pointing device such as a mouse, trackball, etc. but may also be controlled by a touch pad, touch screen, keyboard, keypad, etc. A pointing device contains a multidirectional detection device and/or one or more buttons or keys. Actuation of the pointing device directs the movement of the cursor on the display. To point to a displayed visual element, a pointing device, e.g., a mouse, is used to move the cursor over the visual element. Often, the appearance of the visual element changes to indicate that the cursor is positioned over the visual element.

A commonly applied appearance change is "highlighting." When a visual element is highlighted, the appearance of the visual element is altered in a way that calls attention to the visual element while keeping the visual element recognizable. Examples of highlighting include, but are not limited to, reversing the intensity of the colors of a visual element to create a "negative" image; changing the color or thickness of a border or background; overlaying a visual element with a transparent color rectangle or other shape; changing the hue, saturation, or value of the colors of a visual element; etc. Highlighting is often used to indicate that a particular visual element has "focus," i.e., is the target of an action. After a cursor is positioned over a visual element, i.e., the visual element has focus and is highlighted, the visual element can be selected by pressing and releasing a mouse button without moving the cursor. Such "clicking" of a mouse button causes actions to be initiated in the computing device, the display, or both. For example, clicking on a visual element presented in a diagramming application may cause a change in a visual element's appearance.

The effect of changing the appearance of a clicked visual element is used to provide "soft" controls such as "soft" buttons. Soft buttons are visual elements that mimic physical buttons such as the buttons on a pointing device. In the following discussion, the term "button" refers to soft buttons and should not be confused with physical buttons, such as mouse buttons. The appearance of a button changes to reflect the state of the button. Button states include, but are not limited to, unpushed, pushed, and disabled. Diagramming applications often use buttons and other soft controls to enable user interaction.

A visual element may also be moved in the display by "dragging" the visual element. Dragging is performed by pressing a button or key and holding down the button or key while moving the mouse causing the cursor and the visual element the cursor is over to move. In both clicking and dragging, the button or key is usually a part of the pointing device, e.g., a mouse button, but may be a part of another device, e.g. a key on a keyboard. Clicking and dragging visual elements often occurs inside of windows and panes. A window is a bounded region of a display that is dedicated to presenting visual elements and/or providing a particular set of functions, i.e., actions. A pane is a bounded subregion within a window that is usually dedicated to working with a subset of the visual elements and/or functions provided by the containing window. Windows and panes are normally rectangular but may be any two dimensional shape.

While moving the focus, e.g., highlight, from one visual element to another, selecting visual elements, and invoking actions may be supported by a mouse having buttons, such activities may also be supported by keys on a keyboard. For example, pressing a tab key may cause the focus to move one visual element to another and pressing a return key may select a visual element that has focus. Thus, actions, described herein as invoked using a mouse with buttons, may also be invoked using a keyboard with keys.

Figure 2:
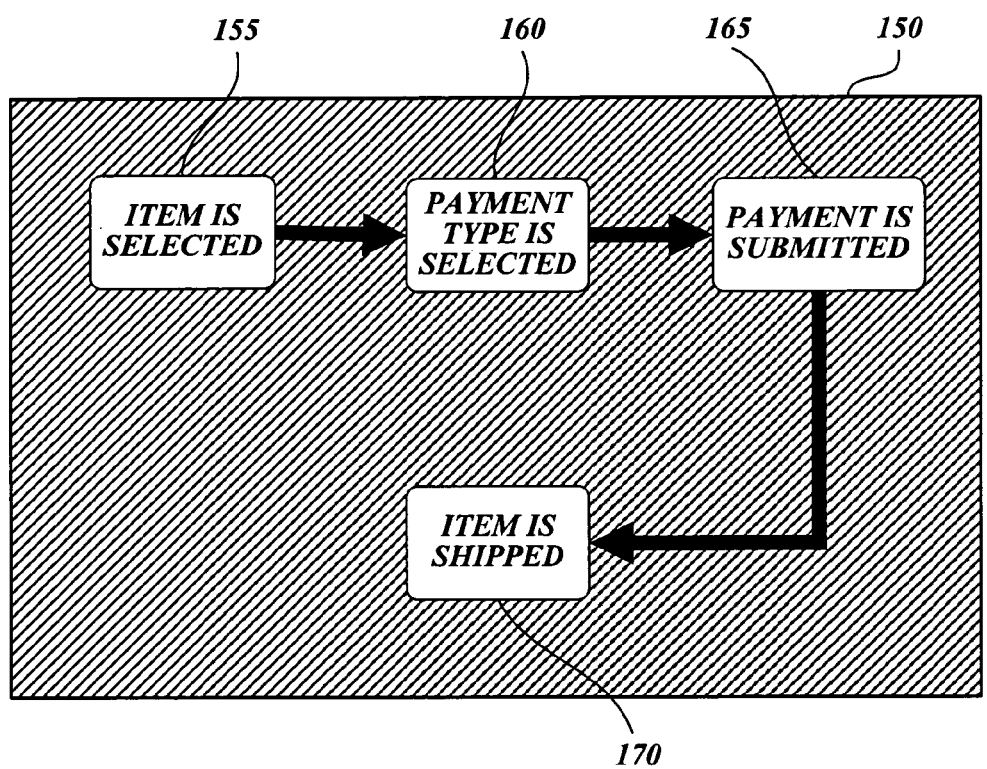
FIG. 2 is a pictorial illustration of an exemplary pane in an exemplary GUI containing an exemplary process diagram.

Diagramming applications provide one or more windows and/or panes in which to view diagrams and controls, including but not limited to, buttons to manipulate the visual elements comprising the diagrams. In a window or pane of a diagramming application, simple hierarchical diagrams can be formed using only text to represent nodes and using indentation to represent levels and relationships between levels. Alternately, nodes may be represented by visual elements shaped as rectangles, circles, etc., i.e., shapes. Shapes may or may not contain lines or blocks of text. FIGS. 1 and 2 illustrate examples of diagrams that use shapes containing text. FIG. 1 illustrates an exemplary radial diagram 100 and FIG. 2 illustrates an exemplary process diagram 150. Note that the shapes used to represent nodes depend on the diagram type, the data contained in the node, and/or the relationships of the node to the surrounding nodes. For example, in the exemplary radial diagram 100 shown in FIG. 1 nodes are represented by circles containing text and in the exemplary process diagram 150 shown in FIG. 2 nodes are represented by round cornered rectangles, i.e., rounded rectangles.

A radial diagram, such as the radial diagram 100 shown in FIG. 1, is a diagram in which a center circle is surrounded by a plurality of peripheral circles. Radial diagrams are used to represent relationships between each of a plurality of items and one central item. Each item is stored in a node in the data graph represented by the diagram. Each node is represented in the radial diagram as a circle. Each circle in the plurality of peripheral circles is connected to the center circle by a line. The lines between the central circle the peripheral circles are "connectors." A connector is a visual element representing a relationship between the nodes represented by the shapes, i.e., circles, connected by the connector. The exemplary radial diagram 100 in FIG. 1 illustrates relationships between a city and a plurality of cities. The radial diagram 100 comprises one central circle 105 surrounded by four peripheral circles 110, 115, 120, and 125, each connected to the central circle by a line. Each circle is labeled with the name of the city associated with the node that the circle represents. Central circle 105 is labeled SEATTLE; peripheral circle 110 is labeled DENVER; peripheral circle 115 is labeled CHICAGO; peripheral circle 120 is labeled DALLAS; and peripheral circle 125 is labeled ATLANTA. The lines between the central circle 105 and each of the four peripheral circles 110, 115, 120, and 125 are connectors that may, for example, indicate that there are direct airline flights between Seattle and the connected cities. Note that a radial diagram, such as radial diagram 100 shown in FIG. 1 is an example a diagram that represents a hierarchical data model. Specifically, the node levels of the data tree are implied by the size of the circles but not otherwise explicitly represented.

Process diagrams, such as the process diagram 150 shown in FIG. 2, are used to represent linear processes. A linear process is a process in which the stages in the process occur one after the other with no branching. Each stage is stored in a data graph as a node. Each node is represented in the process diagram as a rounded rectangle. The exemplary process represented by the process diagram 150 shown in FIG. 2 has four stages, each stored as a node in a data graph. The four nodes in the data graph are represented in the process diagram 150 as four rounded rectangles. The first node in the data graph, i.e., the first stage in the process, is represented by rounded rectangle 155 labeled ITEM IS SELECTED. To the right of rounded rectangle 155 is the second rounded rectangle 160 labeled PAYMENT TYPE IS SELECTED. To the right of rounded rectangle 165 is the third rounded rectangle 165 labeled PAYMENT IS SUBMITTED. Below and to the left of rounded rectangle 165 is the fourth and final rounded rectangle 170 labeled ITEM IS SHIPPED. Connectors representing the advancement from stage to stage are arrows.

In the past, diagrams have been assembled and modified by inserting and locating visual elements like shapes, bullets, and text. For example, a shape, e.g., peripheral circle 110 shown in FIG. 1, may be inserted into a diagram by clicking a button, e.g., an Insert Shape button. Text may be entered into the shape, e.g., DENVER. A corner of the shape may be dragged to resize the shape. The shape may be dragged to a location. While, preferably, connectors are automatically inserted as each shape is inserted, a diagramming program may require manual insertion of connectors. Instead of, or in addition to, dragging shapes to a location, selecting special purpose buttons may be used to insert a shape before, after, above, or below an existing shape. Special purpose buttons include, but are not limited to, Insert Before, Insert After, Insert Level Above, and Insert Level Below.

The results of selecting special purpose buttons are most easily understood in diagrams that explicitly show a hierarchical structure, e.g., an organization diagram of a company. The results of selecting special purpose buttons is less clear for a diagram with a flat, i.e., non-tree, structure such as a process diagram. For example, if a special purpose button such as Insert Level Above is selected, the effect of the special purpose button selection on a process diagram, e.g., the process diagram 150 shown in FIG. 2, is not clear. Even after extensive experimentation, users may not be sure what special controls cause what behaviors.

In order to avoid the foregoing, it is desirable for a diagramming application to enable creating diagrams without relying on special purpose buttons that require users to know what button to select, the diagram type, and the type of node to be inserted. It is also desirable for a diagramming application to minimize the number of actions, e.g., selections, a user must perform to insert and locate visual elements in a diagram and reduce the detailed knowledge required. Instead of presenting a user with many controls, the present diagramming applications may use "smart insertion" to aid the user in building a diagram that makes efficient use of the diagram's nodes, i.e., a well balance diagram. "Smart insertion" is used by a diagramming application to enable the diagramming application to predict what a user intends when inserting shapes in a diagram. A shape that is inserted through a process of smart insertion is said to be "smartly inserted."

The effects of using smart insertion can be overridden using more direct and/or specific controls. For example, if a diagram is built using smart insertion and a node is restricted to having no more than two child nodes, the restriction may be overridden and additional child nodes may be inserted using a user control, e.g., a "split button." A split button is a button comprising an icon representing an action, i.e., an action icon, and a downward pointing arrowhead icon. If the action icon is selected, the action represented by the action icon is invoked. If the arrowhead icon is selected, a menu providing alternate actions to the action of the action icon is displayed near the action icon. If a menu item is selected, the action for the menu item is invoked. For example, a split button may comprise an Insert Shape button that invokes a smart insertion action and an arrowhead icon that provides a menu comprising menu items to invoke Insert Before, Insert After, Insert Level Above, and Insert Level Below actions. If the Insert Shape icon is selected the shape is smartly inserted as described above. If a menu item is selected, e.g., Insert Level Above, the action represented by the icon is invoked, e.g., a shape is inserted at a level above the selected shape. Controls other than a split button, e.g., keys on a keyboard, may be used to override smart insertion. The use of a split button to override smart insertion should be construed as exemplary and not limiting.

Figure 3:
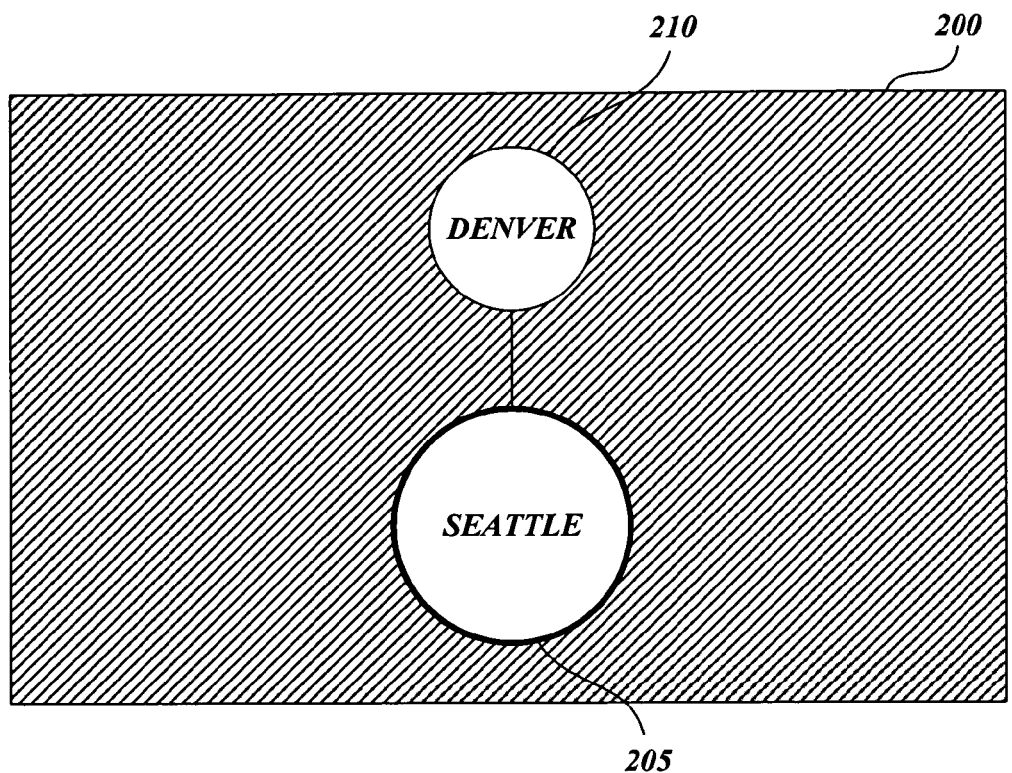
FIG. 3 is a pictorial illustration of an exemplary pane in an exemplary GUI containing an exemplary radial diagram, including one peripheral circle, with the center circle selected.
Figure 4:
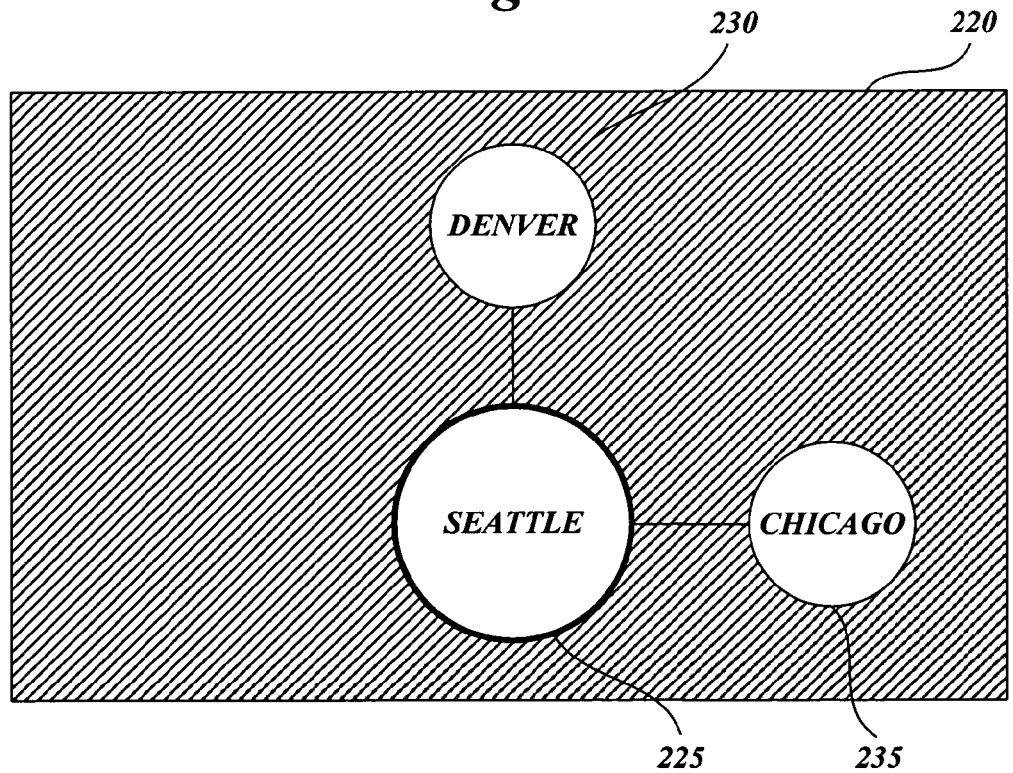
FIG. 4 is a pictorial illustration of an exemplary pane in an exemplary GUI containing an exemplary radial diagram, including two peripheral circles, with the center circle selected.
Figure 5:
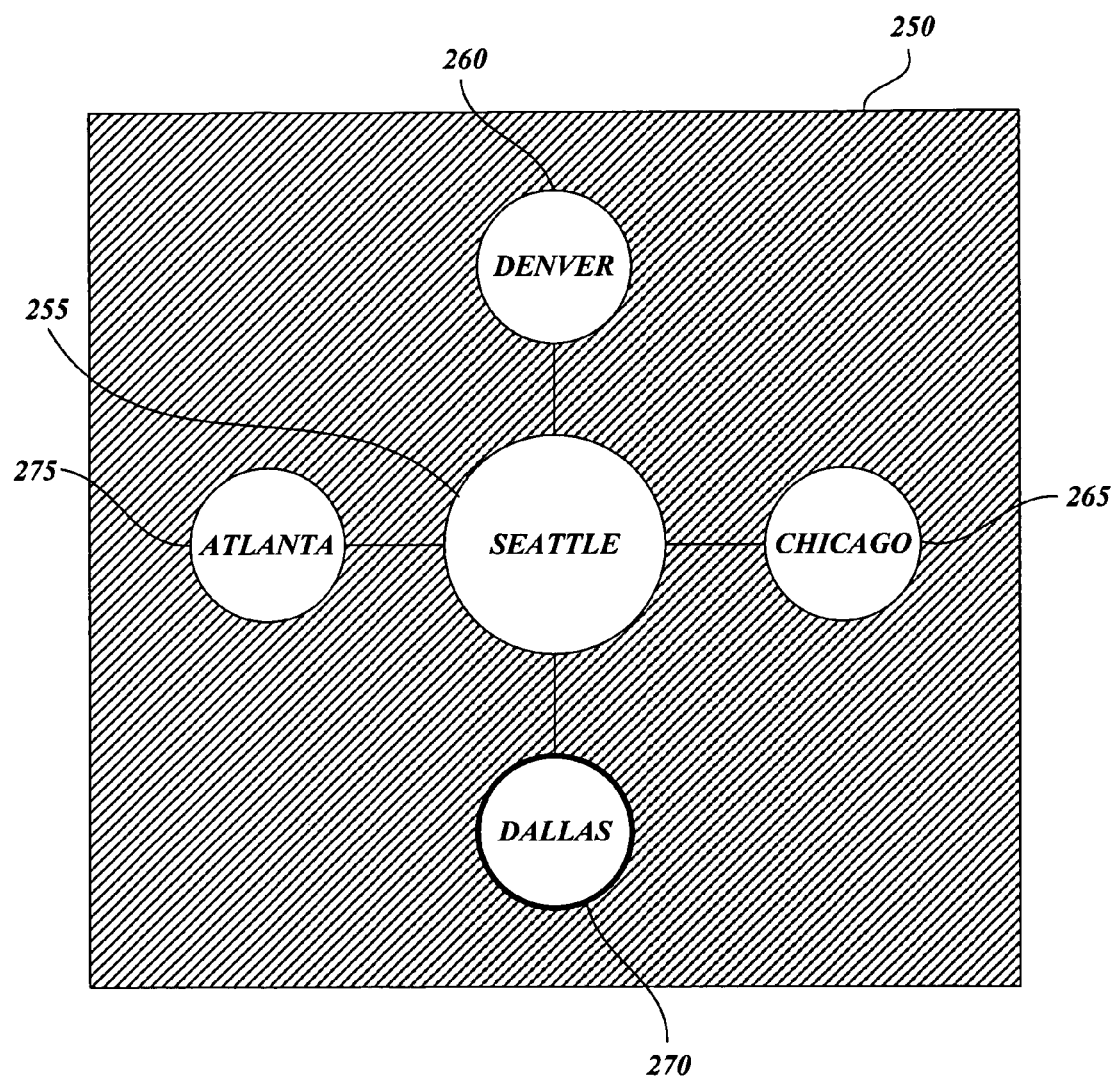
FIG. 5 is a pictorial illustration of an exemplary pane in an exemplary GUI containing an exemplary radial diagram, including four peripheral circles, with a lower peripheral circle selected.
Figure 12A:
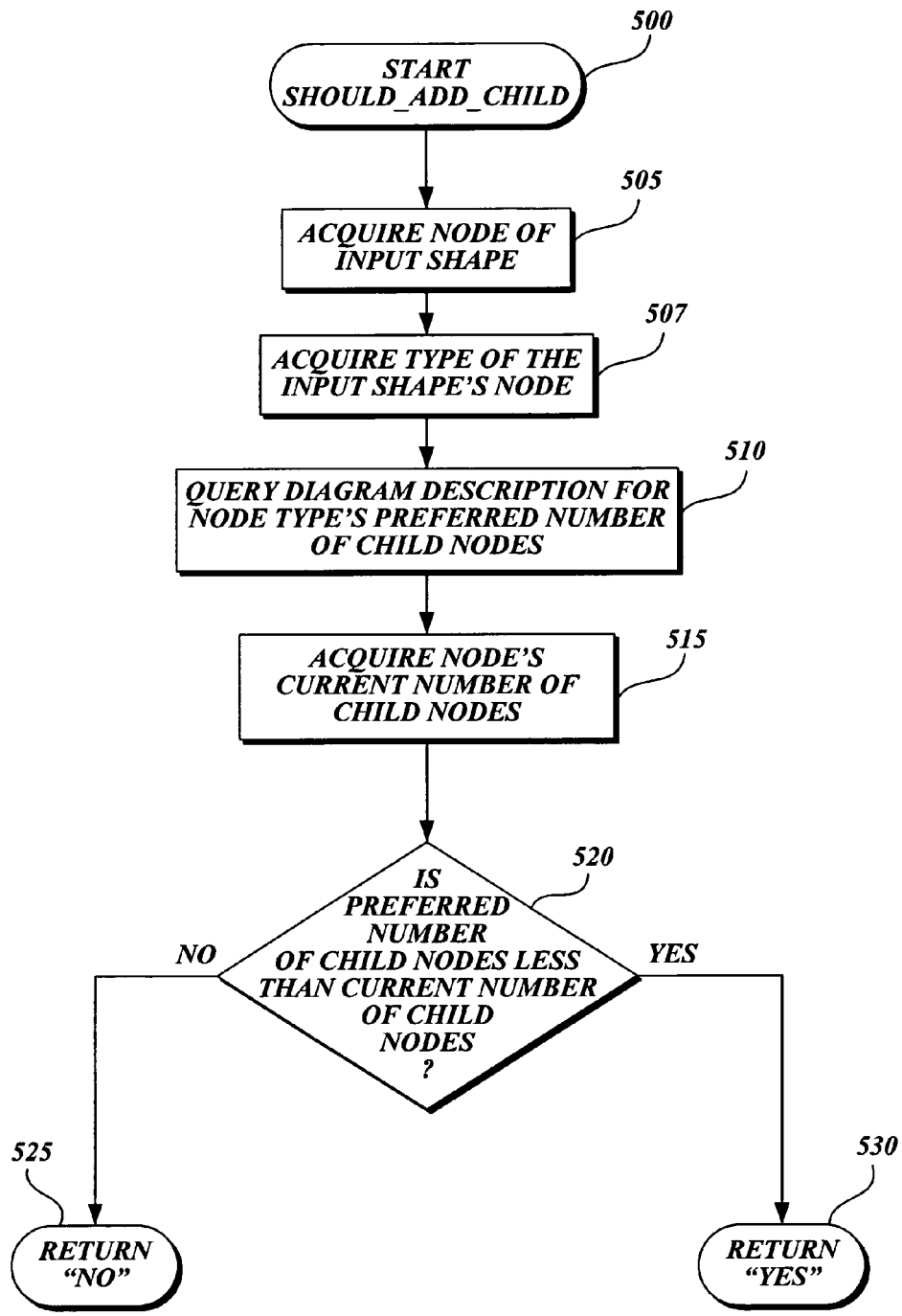
FIG. 12A is an exemplary functional flow diagram of an exemplary subroutine for determining if a child shape should be added to a diagram.
Figure 12B:
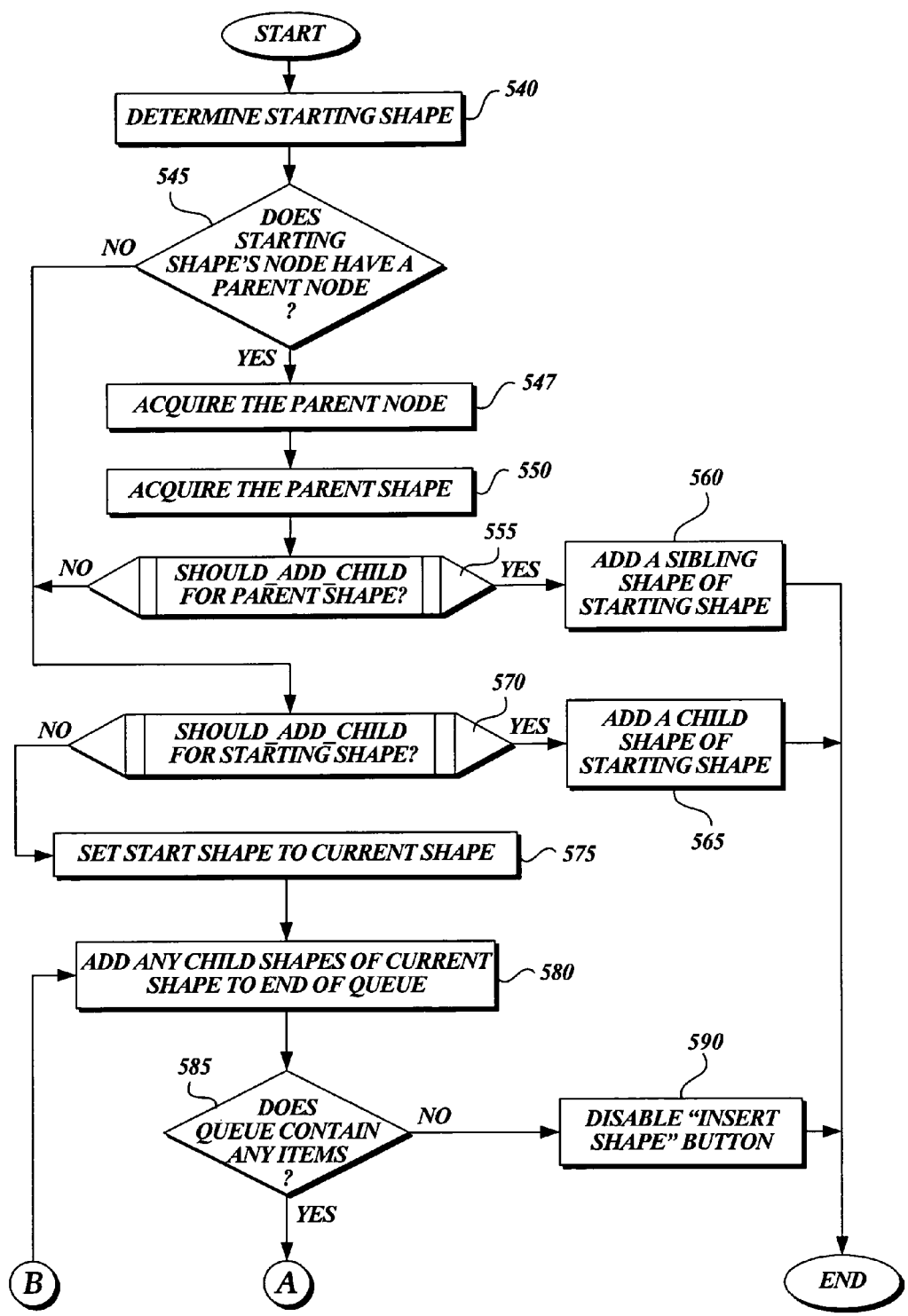
FIGS. 12B-12C comprise an exemplary functional flow diagram, which uses the subroutine shown in FIG. 12A and illustrates how shapes are inserted into diagrams.
Figure 12C:
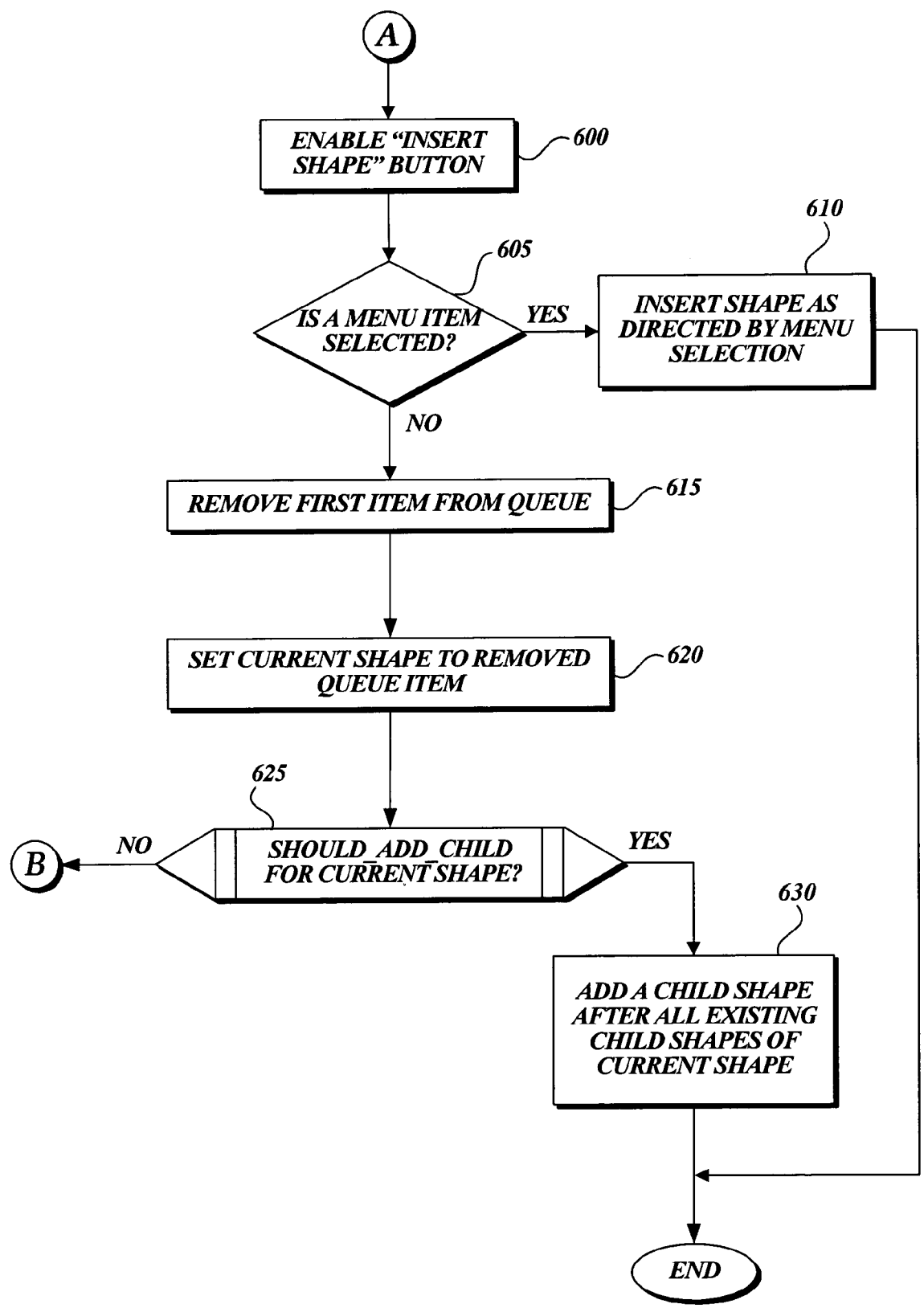

Examples of the results of smart insertion progressively applied to radial diagrams are shown in FIGS. 3-5. A functional flow diagram showing how the smart insertion process operates is illustrated in FIGS. 12A-12C and described below. FIG. 3 illustrates an exemplary radial diagram 200 in which the first few exemplary stages of diagram assembly have been executed. The exemplary radial diagram 200 comprises a central circle 205 labeled SEATTLE and a peripheral circle 210 labeled DENVER. Preferably, when a radial diagram such as radial diagram 200 is started, the central circle is visible and accessible. For example, central circle 205 is visible and accessible for entering text, e.g. SEATTLE. The central circle 205 is selected as indicated by the heavy line outlining. Selection may also be indicated by other graphic techniques such as, but not limited to, highlighting. The use of heavy outlining to indicate selection should be construed as exemplary and not limiting. With central circle 205 selected, an action, e.g., selecting Insert Shape, occurs and causes a peripheral circle 210 to be inserted into the radial diagram 200. Because central circle 205 is selected, and because in this example only child nodes of central circle 205's node may be inserted, smart insertion causes the peripheral circle 210 to be inserted into the radial diagram 200 above central circle 205. A straight line is automatically inserted between central circle 205 and the peripheral circle 210. A text label is inserted into the peripheral circle 210, i.e., DENVER, by the user.

FIG. 4 illustrates an exemplary radial diagram 220 that is partially assembled using stages similar to stages illustrated in FIG. 3 and in which additional exemplary stages of diagram assembly are executed. As in the radial diagram 200 shown in FIG. 3, the radial diagram 220 in FIG. 4 contains a central circle 225, labeled SEATTLE and peripheral circle 230, labeled DENVER. The central circle 225 in the radial diagram 220 is selected. An action, e.g., selecting Insert Shape, occurs and causes an additional peripheral circle to be inserted into the radial diagram 220. Because the central circle 225 is selected and only child nodes of central circle 225's node may be inserted, smart insertion causes the peripheral circle 235 to be inserted into the radial diagram 220 to the right of the central circle 225. A straight line is automatically inserted between the central circle 225 and the peripheral circle 235. A text label is inserted into the peripheral circle 235, i.e., CHICAGO, by the user.

FIG. 5 illustrates an exemplary radial diagram 250 that is partially assembled using stages similar to stages illustrated in FIGS. 3 and 4 and in which additional exemplary stages of diagram assembly are executed. As in the radial diagram 220 shown in FIG. 4, the radial diagram 250 shown in FIG. 5 contains a central circle 255, labeled SEATTLE, and peripheral circles 260, 265, and 270, respectively labeled DENVER, CHICAGO, and DALLAS. Peripheral circle 270 in radial diagram 250 is selected. An action, e.g., selecting Insert Shape, occurs and causes an additional peripheral circle to be inserted into the radial diagram 250. Notice that even though peripheral circle 270 is selected, smart insertion causes a peripheral circle 275 to appear in the radial diagram 250 to the left of central circle 255. The peripheral circle 275 is inserted because in this example, the "diagram definition" for the radial diagram 250 allows only the node for the central circle 255 to have child nodes. Diagram definitions specify the layout of diagrams and are explained in more detail below. A straight line is automatically inserted between the central circle 255 and the peripheral circle 275. A text label is inserted into the peripheral circle 275, i.e., ATLANTA, by the user.

Figure 6:
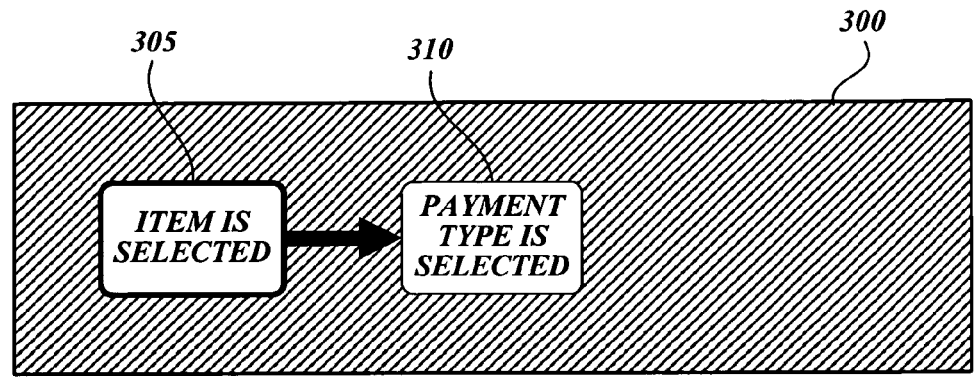
FIG. 6 is a pictorial illustration of an exemplary pane in an exemplary GUI containing an exemplary process diagram, including two blocks, with the left block selected.

As illustrated in FIGS. 3-5 and described above, smart insertion enables diagram assembly by intelligently inserting appropriate shapes in appropriate locations in diagrams such as the diagrams illustrated in FIGS. 3-5. Smart insertion may also be applied to less hierarchical, i.e., more linear, diagrams illustrated in FIGS. 6-11 as well as the more hierarchical diagrams illustrated in FIGS. 3-5. FIG. 6 is an exemplary process diagram 300 in which the first part of a diagram assembly of the type illustrated in FIG. 2 are shown. The exemplary process diagram 300 comprises first and second rounded rectangles 305 and 310. Preferably, when a process diagram such as process diagram 300 is started, the first rounded rectangle 305 is visible and accessible. For example, the first rounded rectangle 305 is visible and accessible for entering text, e.g. ITEM IS SELECTED, by the user. When the first rounded rectangle 305 is selected and an action, e.g., selecting Insert Shape, occurs, the second rounded rectangle 310 is inserted into the process diagram 300. It is important to note that although the process diagram 300 has a linear visual structure, the process diagram 300 represents a data graph with a root node and a plurality of child nodes of the root. The plurality of child nodes occupy one level, the level below the root. The root node is not represented in the process diagram 300. Only the child nodes of the root are represented. For example, the first rounded rectangle 305 represents a child node of the unrepresented, i.e., hidden, root node. Because only child nodes of the hidden root may be represented and because the child nodes of the hidden root occupy the same level, when a rounded rectangle is inserted into the process diagram 300, the rounded rectangle appears on the same level as the existing rounded rectangles. Given these rules, smart insertion causes the second rounded rectangle 310 to appear in the process diagram 300 to the right of the first rounded rectangle 305. An arrow is automatically inserted pointing from the first rounded rectangle 305 to the second rounded rectangle 310. Text is inserted into the second rounded rectangle 310, i.e., PAYMENT TYPE IS SELECTED, by the user.

Figure 7:
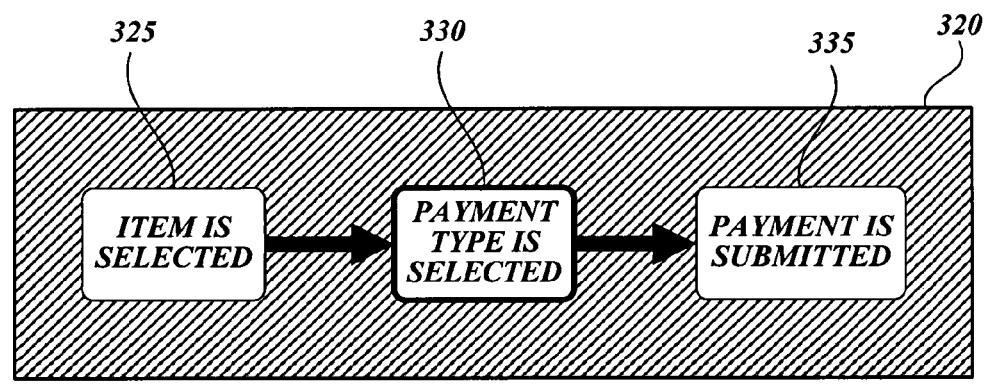
FIG. 7 is a pictorial illustration of an exemplary pane in an exemplary GUI containing an exemplary process diagram, including three blocks, with a middle block selected.

FIG. 7 is an exemplary process diagram 320 that includes the partial assembly illustrated in FIG. 6 and described above and an additional (third) rounded rectangle. The process diagram 320 shown in FIG. 7 includes two rounded rectangles 325 and 330, similar to the rounded rectangles 305 and 310 illustrated in FIG. 6, plus a third rounded rectangle 335. As with FIG. 6, the first rounded rectangle 325 is labeled ITEM IS SELECTED, and the second rounded rectangle 330 is labeled PAYMENT TYPE IS SELECTED. The second rounded rectangle 330 in process diagram 320 is selected as indicated by a heavy outline. When an action, e.g., selecting Insert Shape, occurs an additional (third) rounded rectangle is inserted into the process diagram 320. Because the second rounded rectangle 330 is selected and because only child nodes of the hidden root may be inserted, smart insertion causes the third rounded rectangle 335 to appear in the process diagram 320 to the right of the second rounded rectangle 330. An arrow is automatically inserted pointing from the second rounded rectangle 330 to the third rounded rectangle 335. Text, i.e., PAYMENT IS SUBMITTED, is inserted into rounded rectangle 335, by the user.

Figure 8:
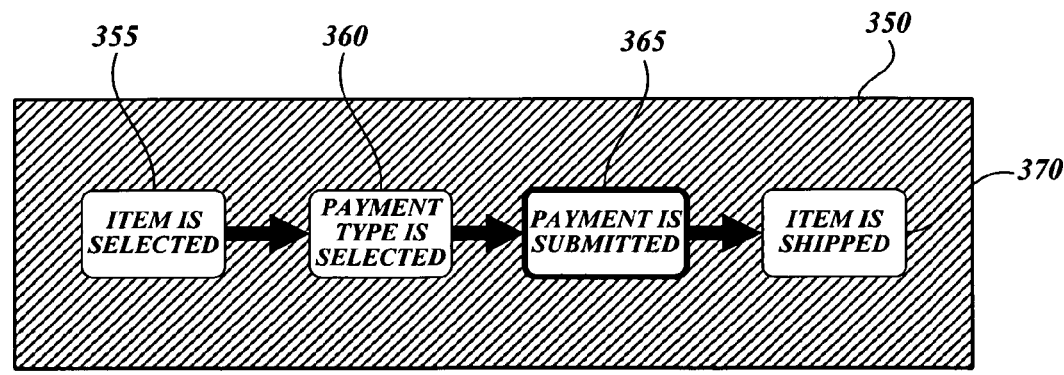
FIG. 8 is a pictorial illustration of an exemplary pane in an exemplary GUI containing an exemplary process diagram, including four blocks, with the second from right block selected.

FIG. 8 is an exemplary process diagram 350 that includes the partial assemblies illustrated in FIGS. 6 and 7 and an additional (fourth) rounded rectangle. Also, the sizes of the rounded rectangles have been reduced to allow the additional (fourth) rounded rectangle to be included in the process diagram 350. Reducing the size of the rounded rectangles is an example of how a diagram definition may define how shapes are laid out in a diagram. As with FIGS. 6 and 7, the first rounded rectangle 355 is labeled ITEM IS SELECTED, the second rounded rectangle 360 is labeled PAYMENT TYPE IS SELECTED, and the third rounded rectangle 365 is labeled PAYMENT IS SUBMITTED. The third rounded rectangle 365 is selected as indicated by heavy outline. When an action, e.g., clicking Insert Shape, occurs the additional (fourth) rounded rectangle is inserted into the process diagram 350. Because the third rounded rectangle 365 is selected and because only child nodes of the hidden root may be inserted, smart insertion causes the fourth rounded rectangle 370 to appear in the process diagram 350 to the left of the third rounded rectangle 365. An arrow is automatically inserted pointing from the third rounded rectangle 365 to the fourth rounded rectangle 370. Text, i.e., ITEM IS SHIPPED, is inserted into rounded rectangle 370, by the user.

Figure 9:
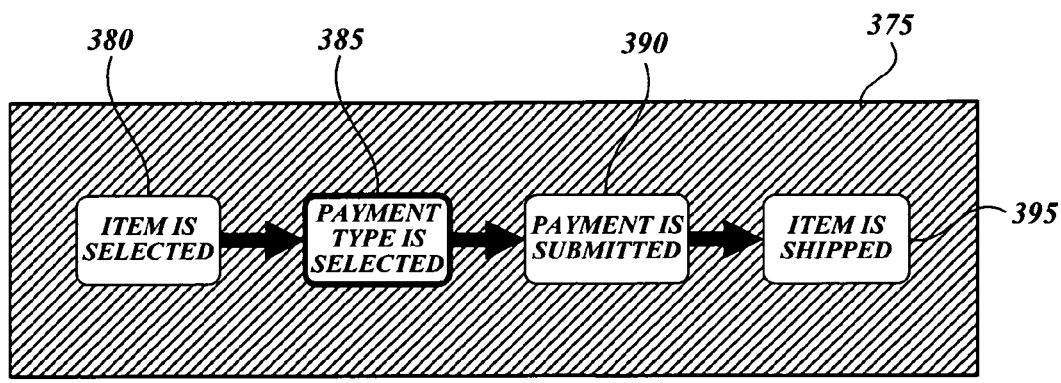
FIG. 9 is a pictorial illustration of an exemplary pane in an exemplary GUI containing an exemplary process diagram, including four blocks, with the second block selected.

FIG. 9 is an exemplary process diagram 375 that is similar to the process diagram 350 shown in FIG. 8. As with FIG. 8, the first rounded rectangle 380 is labeled ITEM IS SELECTED, the second rounded rectangle 385 is labeled PAYMENT TYPE IS SELECTED, the third rounded rectangle 390 is labeled PAYMENT IS SUBMITTED, and the fourth rounded rectangle 395 is labeled ITEM IS SHIPPED. Unlike FIG. 8, in FIG. 9, the second rounded rectangle 385 is selected as indicated by heavy outline. When an action, e.g., clicking Insert Shape, occurs, the third rounded rectangle 395 is inserted into the process diagram 350. Because the second rounded rectangle 385 is selected and because only child nodes of the hidden root may be inserted, smart insertion causes the third rounded rectangle 390 to appear in the process diagram 395 after the second rounded rectangle 385. An arrow is automatically inserted pointing from the second rounded rectangle 385 to the third rounded rectangle 390. Text, i.e., PAYMENT IS SUBMITTED, is inserted into rounded rectangle 390, by the user.

Figure 10:
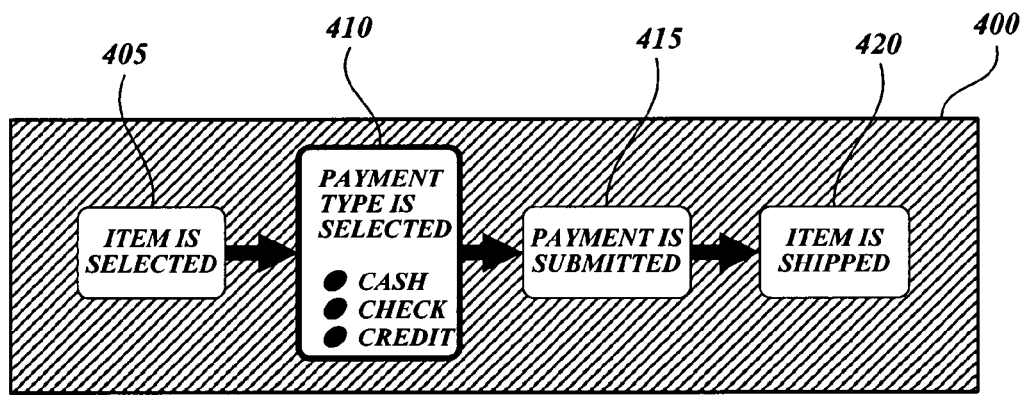
FIG. 10 is a pictorial illustration of an exemplary pane in an exemplary user interface containing an exemplary process diagram, including four blocks, with the middle block selected and containing three bullets.
Figure 11:
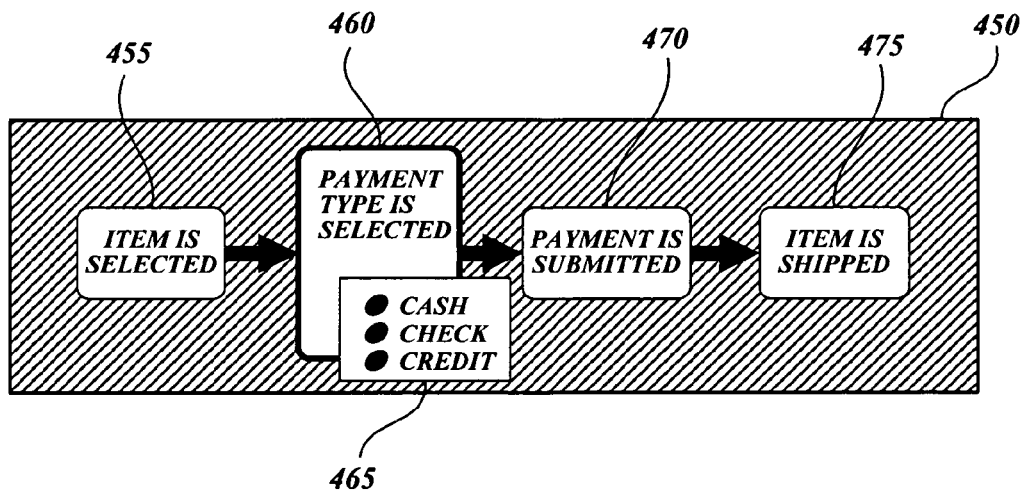
FIG. 11 is a pictorial illustration of an exemplary pane in an exemplary user interface containing an exemplary process diagram, including four blocks, with a bullet block in front of the selected middle block.

As illustrated in FIGS. 3-9 and described above, smart insertion enables diagram assembly by intelligently inserting appropriate shapes in appropriate locations in hierarchical and non-hierarchical, i.e., linear, diagrams. Smart insertion may also be used to insert "bullets" into diagrams as illustrated in FIGS. 10-11 and described below. The term "bullet" is often used to refer to small graphic symbols used to accent text but may also be used to refer to the "bulleted" text or the combination of bullet and text. In the following discussion, the term "bullet graphic" refers to a graphic symbol used to accent text; the term "bulleted text" refers to text accented by a bullet; and "bullet" refers to a combination of a bullet graphic and bulleted text. A shape may or may not support bullets, i.e., allow bullets to be added to the shape. Bullets may be placed in a shape, usually below a line of text or text block in the shape. Bullets may also be placed in an "adornment shape" which may overlap or is otherwise visually associated with a shape.

Bullets may be semantic or non-semantic. A semantic bullet is represented in a data model as a node whereas a non-semantic bullet is represented as an attribute of text within the node, i.e., as a formatting property on the text. A semantic bullet is recognized by smart insertion and is included in calculations and decisions involving the insertion and in the placement of shapes and bullets. A non-semantic bullet, i.e., a format bullet, is not recognized by smart insertion and is not counted in calculations or used in smart insertion and layout decisions. Both semantic and format bullets are affected by insertion and layout decisions normally made by the diagramming application. If a shape supports bullets, bullets may be smartly inserted into that shape. If an adornment shape supports bullets, bullets are may be smartly inserted into the adornment shape instead of the shape with which the adornment shape is associated.

FIGS. 10-11 illustrate examples of the results of smart insertion of bullets in process diagrams. FIGS. 10-11 illustrate exemplary process diagrams similar to the process diagrams shown in FIGS. 6-9; however, the process diagrams in FIGS. 10-11 also include bullets. The exemplary process diagram 400 shown in FIG. 10 includes four rounded rectangles 405, 410, 415, and 420 connected by arrows. The text in the first rounded rectangle 405 is ITEM IS SELECTED. An arrow points from the first rounded rectangle 405 to the second rounded rectangle 410. The text in the second rounded rectangle 410 is PAYMENT TYPE IS SELECTED. The second rounded rectangle 410 includes three bullets below this text, namely CASH, CHECK, and CREDIT. An arrow points from the second rounded rectangle 410 to third rounded rectangle 415. The text in the third rounded rectangle 415 is PAYMENT IS SUBMITTED. An arrow points from the third rounded rectangle 415 to the fourth rounded rectangle 420. The text in the fourth rounded rectangle 420 is ITEM IS SHIPPED. Because the second rounded rectangle 410 is selected and because the node for the second rounded rectangle 410 allows bullet child nodes, when an action, e.g., selecting Insert Shape, occurs, bullets are smartly inserted into the second rounded rectangle 410.

The exemplary process diagram 450 shown in FIG. 11 includes four rounded rectangles 455, 460, 470, and 475 connected by arrows. The text in the first rounded rectangle 455 is ITEM IS SELECTED. An arrow points from the first rounded rectangle 455 to the second rounded rectangle 460. The text in the second rounded rectangle 460 is PAYMENT TYPE IS SELECTED. An adornment shape 465 overlaps the lower right corner of the second rounded rectangle 460 and contains three bullets: CASH, CHECK, and CREDIT. An arrow points from the second rounded rectangle 460 to the third rounded rectangle 470. The text in the third rounded rectangle 470 is PAYMENT IS SUBMITTED. An arrow points from the third rounded rectangle 470 to the fourth rounded rectangle 475. The text in the fourth rounded rectangle 475 is ITEM IS SHIPPED. Because the second rounded rectangle 460 is selected and because the node for the second rounded rectangle 460 allows bullet child nodes with bullets in an adornment shape, when an action, e.g., selecting Insert Shape, occurs, a bullet is smartly inserted into the adornment shape 465 for the second rounded rectangle 460. If the inserted bullet is the first bullet to be inserted, the adornment shape 465 is laid over the second rounded rectangle 460 and the first bullet is inserted in the adornment shape 465.

As illustrated in FIGS. 3-11 and described above, smart insertion enables a diagramming application to intelligently determine an appropriate shape or bullet to insert into a diagram in response to a request for a shape or bullet. Smart insertion does not require users to know if a node for an inserted shape or bullet is a peer node or child node of the node of a selected shape in order to add a new shape or bullet to a diagram. Smart insertion enables users to build balanced, easy to read diagrams without prior knowledge of the underlying data graphs. One exemplary way showing how smart insertion is accomplished illustrated in FIGS. 12A-12C and described below.

Smart insertion may be used by diagramming applications to determine the type and location of shapes and bullets inserted into diagrams representing a data graph. Smart insertion uses "diagram definitions" to control the overall appearance of diagrams of a diagram type and to control the location of shapes and bullets in diagrams. The diagram definition describes how multiple shapes are laid out in a diagram. For example, in a radial diagram such the radial diagram 100 shown in FIG. 1, the diagram definition may indicate that shapes should be inserted in a clockwise fashion around the central circle. In another example, a diagram definition for a process diagram such the process diagram 350 shown in FIG. 8, may indicate that if a new shape needs to be inserted into the diagram, the shapes already existing in the diagram should be reduced in size to make room for the new shape.

Preferably, a diagram type is described in a computer file, i.e., a diagram definition file, written in a declarative language, e.g., XML. Diagram definition files are read by an engine that interprets the declarative language and exposes the data in the diagram definition to the smart insertion mechanism in a diagramming application. Because diagram definitions are written in an easily understandable format, diagram definitions may be easily written or modified without depending on computer programming knowledge. Using diagram definition files enables describing attractive diagrams without writing and compiling computer instructions thus saving computer programmer time.

In a diagram definition file, node types are described. Associated with each node type are a "child preference" attribute and a plurality of shapes and bullet adornment shapes used by nodes of the node type. The child preference attribute describes the total number of child nodes allowed for the node. For example, if a node description in a diagram definition file has a child preference of three, up to three child nodes can be attached to nodes of the node type. It is possible to have a child preference of zero indicating that no child nodes may be attached to a node. It is also possible to have a child preference of −1 to indicate that an infinite, i.e., unlimited, number of child nodes may be attached to a node. Preferably, a node description also specifies which shape or bullet to use to represent a node in a diagram depending on the node's location in the data graph, the type of the parent node, etc.

Other data may be included in node and diagram definitions. The aforementioned data included in node descriptions and in diagram definitions should be construed as exemplary and not limiting.

The smart insertion process begins with collecting information about a "starting shape" in the diagram. A starting shape is the first shape considered in smart insertion. A starting shape may be a selected shape or a default shape set in a diagram definition or elsewhere in the data used by the diagramming application. Preferably, the information about the starting shape comprises the starting shape's type; the starting shape's node in the data graph; the starting shape's node's parent node in the data graph; the number of child nodes of the starting shape's node; and the number of child nodes of the parent node of the starting shape's node, i.e., the starting node. The smart insertion process continues by selecting a diagram definition in accordance with the diagram's type; extracting information from the diagram definition; and using the information extracted from the diagram definition and the information about the starting shape. The diagram definition information and starting shape information are used to determine the type of node to associate with the inserted shape, the location of the associated node in the data graph, and the inserted shape's location in the diagram. As explained above, the child preference indicates the number of child nodes allowed to be attached to a node. The parent node of the starting node is located in the data graph and the child preference of the parent node is read. If the parent node prefers to have more child nodes, i.e., the child preference is not exceeded, a new node is inserted and becomes a sibling of the starting node. If the parent node does not prefer to have more child nodes, the child preference of the starting node is used to determine if a child node may be attached to the starting node. If the starting node can accept another child node, a new child node is attached to the starting node. If the starting node cannot accept another child node, i.e., the child preference is exceeded, a peer of the starting node is checked.

How the smart insertion process intelligently assembles diagrams is illustrated in FIGS. 12A-12C and described below. FIG. 12A is a functional flow diagram illustrating a subroutine used in the functional flow diagram illustrated in FIGS. 12B-12C, described below. The exemplary title of the subroutine illustrated in FIG. 12A, SHOULD_AD-D_CHILD, is shown in block 500. The purpose of the SHOULD_ADD_CHILD subroutine is to determine if a child node should be added to a node of a shape submitted to the subroutine, i.e., an input shape. The SHOULD_AD-D_CHILD subroutine is called from within the functional flow diagram shown in FIG. 12B. The SHOULD_AD-D_CHILD subroutine shown in FIG. 12A starts with block 500 where an input shape is submitted to the subroutine. At block 505, the node of the input shape is acquired from the data graph. At block 507, the properties of the input shape's node are acquired. At block 510, the diagram definition is queried, i.e., read, to get the node type's preferred number of child nodes, i.e., the node's child preference. At block 515, the node is read to get the node's current number of child nodes. At block 520, the node type's preferred number of child nodes is compared to the node's current number of child nodes. If the preferred number of child nodes is less than the current number of child nodes, the subroutine returns YES at block 530. If the preferred number of child nodes is not less than the current number of child nodes, the subroutine returns NO at block 525.

FIGS. 12B-12C comprise a functional flow diagram of an exemplary smart insertion process. The exemplary smart insertion process begins at block 540 of FIG. 12B by determining the starting shape. At block 545 a test is made to determine if the starting shape's node has a parent node. If the starting shape's node has no parent node, e.g., the starting shape represents a root node, the control flows to block 570. If the starting shape has a parent node, the control flows to block 547. For example, in radial diagram 250 shown in FIG. 5, the peripheral circle 270 is selected. Thus, the peripheral circle 270 is the starting shape. The node represented by the peripheral circle 270 has a parent node, i.e., the node of the central circle 255, so the control flows to block 547. If the central circle 255 had been selected, the central circle 255 would have been the starting shape. The node of central circle 255 has no parent node, i.e., represents a root node, so the control would flow to block 570.

At block 547 of FIG. 12B, the parent node is acquired. At block 550, the shape associated with the parent node, i.e., the parent shape, is acquired. For example, in the radial diagram 250 shown in FIG. 5, the peripheral circle 270 is the starting shape. The node represented by the peripheral circle 270 has a parent node, i.e., the node of central circle 255. The central circle 255's node is represented by a shape, i.e., central circle 255. Central circle 255's node is used to acquire the shape that represents the node, i.e., central circle 255. Thus, the parent shape of the peripheral circle 270 is acquired, i.e., central circle 255. Next, at block 555 (FIG. 12B), the SHOULD_AD-D_CHILD subroutine (FIG. 12A) is called for the parent shape, i.e., central circle 255. The SHOULD_ADD_CHILD subroutine begins at block 505 with the input shape, i.e., central circle 255. The input shape's node, i.e., central circle 255's node, is acquired. At block 507, the type of the input shape's node, i.e., the central circle type, is acquired. At block 510, the diagram definition is queried to get the preferred number of child nodes for central circle type. At block 515, the current number of child nodes of central circle 255's node are acquired. At block 520 the preferred number of child nodes of the central circle type are compared to the current number of child nodes of central circle 255's node. If the preferred number of child nodes of central circle 255's node is less than the current number of child nodes of central circle 255's node, YES is returned at block 530. Otherwise, NO is returned at block 525.

Returning to FIG. 12B, at block 555, if the SHOULD_AD-D_CHILD subroutine called for the parent shape, i.e., central circle 255, returns YES, control flows to block 560. At block 560, a sibling shape of the starting shape, i.e., a child shape of the parent shape, is added to the diagram and the sibling shape's node is added to the data graph. For example, peripheral circle 275 is inserted in the radial diagram 250 shown in FIG. 5 and peripheral circle 275's node is added to the data graph. Peripheral circle 275's node is a child node of central circle 255's node and hence is a sibling node of peripheral circle 270's node. The location of the sibling shape is determined by information associated with the node type of the sibling shape's node in the diagram definition file. After block 560, the process ends. If, at block 555, the SHOULD_AD-D_CHILD subroutine called for the parent shape, i.e., central circle 255, returns NO, control flows to block 570. At block 570, the SHOULD_ADD_CHILD subroutine is called for the starting shape, i.e., peripheral circle 270. If, at block 570, the SHOULD_ADD_CHILD subroutine called for the starting shape returns YES, control flows to block 565. At block 565 a child shape of the starting shape is added, i.e., peripheral circle 270, and the child shape's node is added to the data graph. After block 565, the process ends. If, at block 570, the SHOULD_ADD_CHILD subroutine called for the starting shape, i.e., peripheral circle 270, returns NO, control flows to block 575. At block 575, the start shape, i.e., peripheral circle 270, is set to the current shape.

The control flows from block 575 to block 580. At block 580, child shapes of the current shape, i.e., peripheral circle 270, are added to the end of a queue. Peripheral circle 270 has no child shapes, hence, no items are added to the end of the queue. The control flows from block 580 to block 585. If, at block 585, the queue does not contain any items, the control flows to block 590. At block 590, the "Insert Shape" button is disabled thus restricting a user from inserting more shapes. After block 590, the process ends.

If, at block 585, the queue contains items, e.g., peripheral circle 270 has child shapes, the control flows to block 600 shown in FIG. 12C. At block 600, the "Insert Shape" button, with controls providing a menu of items for alternate actions, e.g., a split button, is enabled. At block 605, it is determined if a menu item has been selected from the menu. If a menu item has been selected, control flows to block 610. At block 610, a shape is inserted as directed by the menu selection, i.e., a shape is inserted by invoking the action represented by the menu selection. After block 610 the process ends.

If, at block 605 shown in FIG. 12C, it is determined that no menu item has been selected, i.e., a smart insertion shape action has been invoked, the control flows to block 615. At block 615, the first item in the queue is removed. At block 620, the first item removed from the queue, e.g., a child shape of peripheral circle 270, is set to the current shape. Control flows from block 620 to block 625. At block 625, the SHOULD_ADD_CHILD subroutine is called for the current shape. If, at block 625, the call to the SHOULD_ADD_CHILD subroutine for the current shape returns YES, the control flows to block 625. At block 630, a child shape is added after all existing child shapes of the current shape and a child node is added in the data graph after all the child nodes of the current shape's node. After block 630, the process ends.

If, at block 625, the call to the SHOULD_ADD_CHILD subroutine for the current shape returns NO, the control flows back to block 580, shown in FIG. 12B. If, at block 585, it is determined that the queue does not contain any items, the flow proceeds to block 590 where the "Insert Shape" button is disabled. Then the process ends.

The smart insertion process illustrated in FIGS. 12A-12C and described above, may also be used to insert bullets. For example, a diagram definition may specify that the child nodes of a shape's node are bullets. When child nodes are added to the shape's node, the child nodes are represented by bullets. Smart insertion may be used to insert shapes and bullets into new diagrams containing no shapes or bullets. Smart insertion may also be applied to default diagrams containing default initial shapes and/or bullets. Preferably, by using smart insertion, balanced, attractive diagrams may be assembled by repeatedly selecting an Add Shape button or a similar control. FIGS. 12A-12C and the above description demonstrate that if a diagram definition is available for a diagram type, the smart insertion process may be applied to a diagram.

While illustrative embodiments have been illustrated and described, it will be appreciated that various changes can be made therein without departing from the spirit and scope of the invention. For example, smart insertion may be applied to other information graphics in addition to diagrams such as, but not limited to, charts, graphs, and maps.

The embodiments of the invention in which an exclusive property or privilege is claimed are defined as follows:

1. A method for determining the location of a shape to be inserted into a diagram representing a data tree, comprising:

determining a starting shape within the diagram;

retrieving information about a node associated with the starting shape from a diagram description that is based on the type of the diagram; and using the information about the node associated with the starting shape to determine a shape to be inserted in the diagram and the location of the shape in the diagram, wherein using the information about the node associated with the starting shape to determine a shape to be inserted in the diagram and the location of the shape in the diagram comprises comparing a preferred number of child nodes associated with the node associated with the starting shape to the current number of child nodes associated with the node and associated with the starting shape and using the results of the comparison to determine the shape to be inserted in the diagram and the location of shape in the diagram.

2. The method of claim 1 wherein the retrieved information about the node associated with the starting shape includes the number of nodes associated with the node associated with the starting shape.

3. The method of claim 1 also comprising determining if the node associated with the starting shape has a parent node.

4. The method of claim 1 wherein user interface controls for inserting shapes in a diagram are disabled depending on the outcome of the comparison.

5. The method of claim 1 wherein the insertion of a shape based on the results of the comparison is overridden in response to a user selecting an interface control For inserting shapes in a diagram.

6. The method of claim 1 wherein the starting shape in the diagram is a selected shape.

7. The method of claim 1 wherein the starting shape in the diagram is a default shape.

8. The method of claim 1 wherein the shape to be inserted in the diagram is a bullet.

9. The method of claim 1 wherein the method requires no modification to provide smart shape insertion for diagram types for which there are diagram descriptions.

10. Computer-readable medium containing computer executable instructions when executed:

determines a starting shape within the diagram;

retrieves information about a node associated with the starting shape from a diagram description that is based on the type of the diagram; and uses the information about the node associated with the starting shape to determine a shape to be inserted in the diagram and the location of the shape in the diagram, wherein using the information about the node associated with the starting shape to determine a shape to be inserted in the diagram and the location of the shape in the diagram comprises comparing a preferred number of child nodes associated with the node associated with the starting shape to the current number of child nodes associated with the node and associate with the starting shape and using the results of the comparison to determine the shape to be inserted in the diagram and the location of shape in the diagram.

11. The computer-readable medium of claim 10 wherein the retrieved information about the associated with the starting shape includes the number of nodes associated with the nod associated with the starting shape.

12. The computer-readable medium of claim 10 wherein the computer executable instructions, when executed, also determine if the associated with the starting shape has a parent node.

13. The computer-readable medium of claim 10 wherein user interface controls for inserting shapes in a diagram are disabled depending on the outcome of the comparison.

14. The computer-readable medium of claim 10 wherein the insertion of a shape based on the results of the comparison is overridden in response to a user selecting an interface control for inserting shapes in a diagram.

15. The computer-readable medium of claim 10 wherein the starting shape in the diagram is a selected shape.

16. The computer-readable medium of claim 10 wherein the starting shape in the diagram is a default shape.

17. The computer-readable medium of claim 10 wherein the shape to be inserted in the diagram is a bullet.

18. The computer-readable medium of claim 10 wherein the method requires no modification to provide smart shape insertion for diagram types for which there are diagram descriptions.

* * * * *

UNITED STATES PATENT AND TRADEMARK OFFICE
CERTIFICATE OF CORRECTION

| | | |
|---|---|---|
| PATENT NO. | : 7,423,646 B2 | Page 1 of 1 |
| APPLICATION NO. | : 11/269055 | |
| DATED | : September 9, 2008 | |
| INVENTOR(S) | : Shailesh Saini et al. | |

It is certified that error appears in the above-identified patent and that said Letters Patent is hereby corrected as shown below:

In column 14, line 29, in Claim 5, delete "For" and insert -- for --, therefor.

In column 14, line 56, in Claim 10, delete "associate" and insert -- associated --, therefor.

In column 14, line 61, in Claim 11, before "associated" insert -- node --.

In column 14, line 63, in Claim 11, delete "nod" and insert -- node --, therefor.

In column 14, line 66, in Claim 12, before "associated" insert -- node --.

Signed and Sealed this
Nineteenth Day of April, 2011

David J. Kappos
*Director of the United States Patent and Trademark Office*